United States Patent
Oristaglio et al.

(10) Patent No.: US 6,700,381 B2
(45) Date of Patent: Mar. 2, 2004

(54) METHOD AND APPARATUS FOR LOCATING OBJECTS USING PARAMETRIC INVERSION

(75) Inventors: Michael L. Oristaglio, Newtown, CT (US); Thorkild Hansen, Brighton, MA (US); Douglas E. Miller, Sandy Hook, CT (US)

(73) Assignee: Witten Technologies Inc., Boston, MA (US)

( * ) Notice: Subject to any disclaimer, the term of this patent is extended or adjusted under 35 U.S.C. 154(b) by 0 days.

(21) Appl. No.: 10/117,093

(22) Filed: Apr. 8, 2002

(65) Prior Publication Data

US 2003/0189427 A1 Oct. 9, 2003

(51) Int. Cl.[7] .................................................. G01V 3/11
(52) U.S. Cl. ......................... 324/326; 324/67; 702/150
(58) Field of Search ....................... 324/326, 67, 339, 324/345, 529, 232; 342/459; 702/11, 150

(56) References Cited

U.S. PATENT DOCUMENTS

| | | | |
|---|---|---|---|
| 3,665,466 A | | 5/1972 | Hibbard |
| 4,905,008 A | | 2/1990 | Kawano et al. |
| 5,194,812 A | * | 3/1993 | Yokoi .......................... 324/326 |
| 5,248,975 A | | 9/1993 | Schutz |
| 5,339,080 A | | 8/1994 | Steinway et al. |
| 5,361,029 A | * | 11/1994 | Rider et al. .................. 324/326 |
| 5,499,029 A | | 3/1996 | Bashforth et al. |
| 5,579,430 A | | 11/1996 | Grill et al. |

(List continued on next page.)

FOREIGN PATENT DOCUMENTS

| | | |
|---|---|---|
| JP | 59-37474 | 2/1984 |
| JP | 59-231466 | 12/1984 |
| JP | 60-235080 | 11/1985 |
| JP | 1-274092 | 11/1989 |
| WO | WO 88/04063 | 6/1988 |

OTHER PUBLICATIONS

John E. McFee and Yogadish Das, "Determination of the Parameters of a Dipole by Measurement of its Magnetic Field," IEEE Transactions on Antennas and Propagation, vol. AP–29, No. 2, Mar. 1981, pp. 282–287.*

Ronglin et al. "A New Numerical Technique for Calculating Current Distributions on Curved Wire Antennas–Parametric B–Spline Finite Element Method," IEEE Transactions on Magnetics, vol. 32, No. 3, May 1996, pp. 906–909.*

Paison et al. "UXO Discrimination Using Time Domain Electromagnetic Induction," Procedings Of UXO/Countermine Forum, New Orleans, LA, Apr. 2001, pp. 1–8.*

J.K. van Deen and J.W. de Feijter, "Three–Dimensional Ground Probing Radar", Geological Survey of Finland, Special Paper 16, pp. 35–40, Jun. 1992.

*Primary Examiner*—N. Le
*Assistant Examiner*—Darrell Kinder
(74) *Attorney, Agent, or Firm*—Fulbright & Jaworski LLP

(57) ABSTRACT

An apparatus for locating a target object using parametric inversion employs a signal injector capable of injecting a signal into the target object, wherein at least a portion of the target object is buried, a magnetic field receiver, a matching processor for matching to a magnetic field received by the magnetic field receiver a parametric magnetic field distribution model corresponding to the target object and at least one other object, and a locating processor for locating the target object using parameters from the parametric magnetic field distribution model. A method for locating a target object using parametric inversion injects a signal into the target object, at least a portion of which is buried, receives a magnetic field radiated from the target object, matches to the received magnetic field a parametric magnetic field distribution model corresponding to the target object and at least one other object, and locates the target object using parameters from the parametric magnetic field distribution model.

26 Claims, 9 Drawing Sheets

U.S. PATENT DOCUMENTS

| | | | |
|---|---|---|---|
| 5,629,626 A | * | 5/1997 | Russell et al. ............... 324/345 |
| 5,742,735 A | | 4/1998 | Eberlein |
| 5,767,680 A | * | 6/1998 | Torres-Verdin et al. ..... 324/355 |
| 5,828,219 A | * | 10/1998 | Hanlon et al. .............. 324/529 |
| 5,835,053 A | | 11/1998 | Davis |
| 5,835,054 A | | 11/1998 | Warhus et al. |
| 5,912,639 A | | 6/1999 | Beckner |
| 5,920,285 A | | 7/1999 | Benjamin |
| 6,002,357 A | | 12/1999 | Redfern et al. |
| 6,100,839 A | | 8/2000 | Heger et al. |
| 6,130,641 A | | 10/2000 | Kraeutner et al. |
| 6,215,888 B1 | * | 4/2001 | Eslambolchi et al. ....... 382/100 |
| 6,356,082 B1 | * | 3/2002 | Alkire et al. ............... 324/326 |
| 6,373,252 B1 | * | 4/2002 | Eslambolchi et al. ....... 324/326 |
| 2003/0001556 A1 | * | 1/2003 | Donay et al. .................. 324/67 |

* cited by examiner

METHOD AND APPARATUS FOR LOCATING OBJECTS USING PARAMETRIC INVERSION

BACKGROUND OF THE INVENTION

The present invention relates to parametric inversion systems and methods, and more particularly to parametric inversion systems and methods for locating objects.

It is important during excavation to have a precise map of the subsurface so as to avoid damaging existing utilities such as water, gas, and electric lines. For example, when new pipes are to be installed in a certain area, the location of any existing pipes in that area must be known to avoid damage to them when the trenches for the new pipes are being excavated. The lack of accurate subsurface maps for construction sites results in thousands of broken pipes and billions of dollars in repair costs each year.

With conventional pipe-location equipment, a single-frequency current is injected into a pipe, and the magnetic field of this current is measured on the surface with a single hand-held device. If only a single straight pipe is present, the conventional pipe-location equipment can accurately determine the direction and depth of the pipe from the measured values of the magnetic field on the surface. However, if more than one pipe is present or if a pipe bends significantly, this conventional equipment fails to give an accurate estimate of the pipe location. The reason for this failure is that the method used by the conventional pipe-location equipment is based on the assumption that only a single pipe is present in the subsurface. The parametric inversion systems and methods of the present invention are not based on this restrictive assumption, and can be used to accurately locate multiple pipes and bent pipes in complex environments.

A parametric inversion system consistent with the present invention can overcome the disadvantages of conventional systems. Further, a parametric inversion system consistent with the present invention can fit onto a moving vehicle, trailer, or portable housing so that subsurface images can be formed as the system is moving.

SUMMARY OF THE INVENTION

The present invention provides a methodology for locating objects using parametric inversion. Additional features and advantages of the invention will be set forth in the description which follows, and in part, will be apparent from the description, or may be learned by practicing the invention. The objectives and other advantages of the invention will be realized and obtained by the method and apparatus particularly pointed out in the written description and the claims hereof as well as in the appended drawings.

To achieve these and other advantages and in accordance with the purpose of the invention, as embodied and broadly described, a system according to the invention locates an object using parametric inversion. An apparatus for locating a target object using parametric inversion comprises a signal injector capable of injecting a signal into the target object, wherein at least a portion of the target object is buried, a magnetic field receiver, a matching processor for matching to a magnetic field received by the magnetic field receiver a parametric magnetic field distribution model corresponding to the target object and at least one other object, and a locating processor for locating the target object using parameters from the parametric magnetic field distribution model.

A method for locating a target object using parametric inversion comprises injecting a signal into the target object, at least a portion of which is buried, receiving a magnetic field radiated from the target object, matching to the received magnetic field a parametric magnetic field distribution model corresponding to the target object and at least one other object, and locating the target object using parameters from the parametric magnetic field distribution model.

Both the foregoing general description and the following detailed description are exemplary and explanatory and are intended to provide further explanation of the invention as claimed.

DESCRIPTION OF THE FIGURES

The accompanying drawings, which are incorporated in and constitute part of the specification, illustrate an embodiment of the invention and together with the general description given above and detailed description of the embodiment given below, serve to explain the principles of the invention.

DETAILED DESCRIPTION OF THE INVENTION

Figure 1:
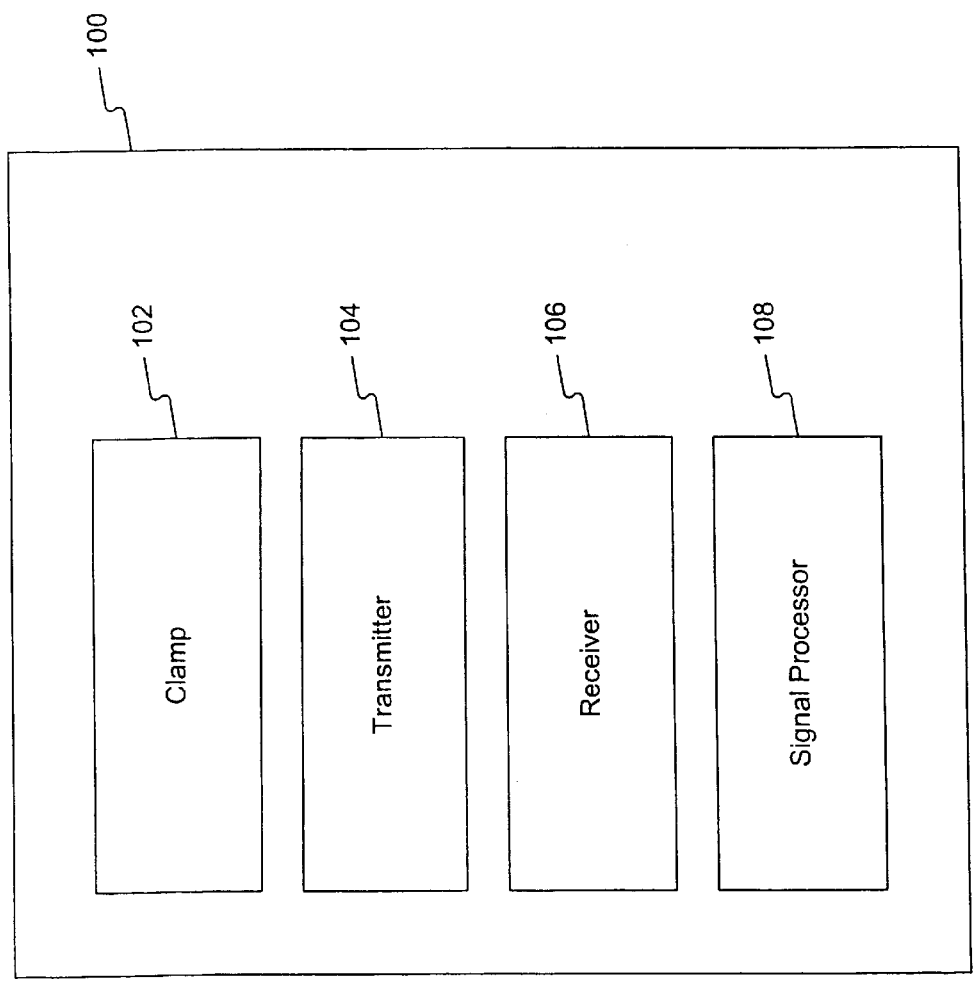
FIG. 1 is a block diagram of an embodiment of an apparatus for locating objects consistent with the present invention.
Figure 2:
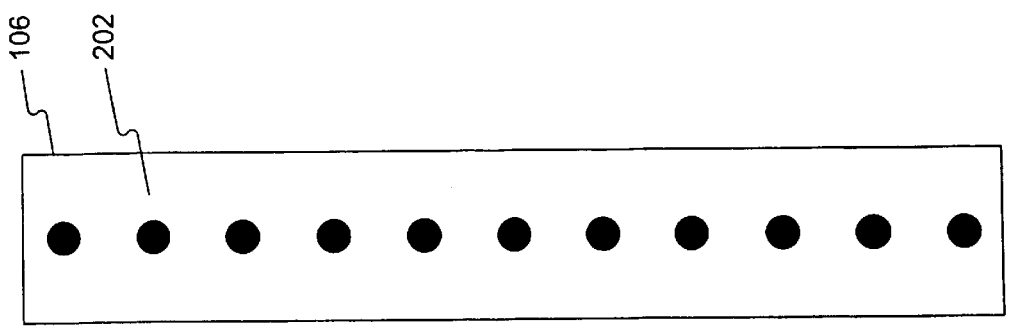
FIG. 2 is a block diagram of an embodiment of a receiver consistent with the present invention.
Figure 2:
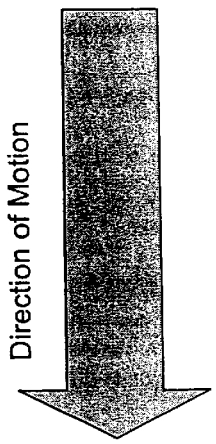

A method and apparatus is disclosed for locating buried objects using parametric inversion. FIG. 1 is an embodiment of an apparatus 100 for identifying buried objects using parametric inversion consistent with the present invention. Apparatus 100 includes clamp 102, transmitter 104, receiver 106, and signal processor 108 (containing a matching processor and locating processor, not shown). Clamp 102 can be, for example, an inductive clamp or a conductive clamp. In an embodiment consistent with the present invention transmitter 104 and receiver 106 comprise a number of transmit and receive array elements, respectively. For example, as depicted in the block diagram of FIG. 2, receiver 106 comprises an array of receiver elements 202 aligned perpendicularly to the direction of motion of receiver 106. Alternatively, receiver 106 can be a synthetic array, i.e., a single receiver moved over the ground to simulate an array.

Radiodetection Corp. distributes a model HCtx-2 transmitter including clamps (for both inductive and conductive coupling) suitable for performing the operations of transmitter 104 and clamp 102. Receiver 106 detects a magnetic field at the transmitter frequency. An example of a suitable receiver for use in embodiments consistent with the present invention includes the PDL-2 receiver from Radiodetection.

Figure 3:
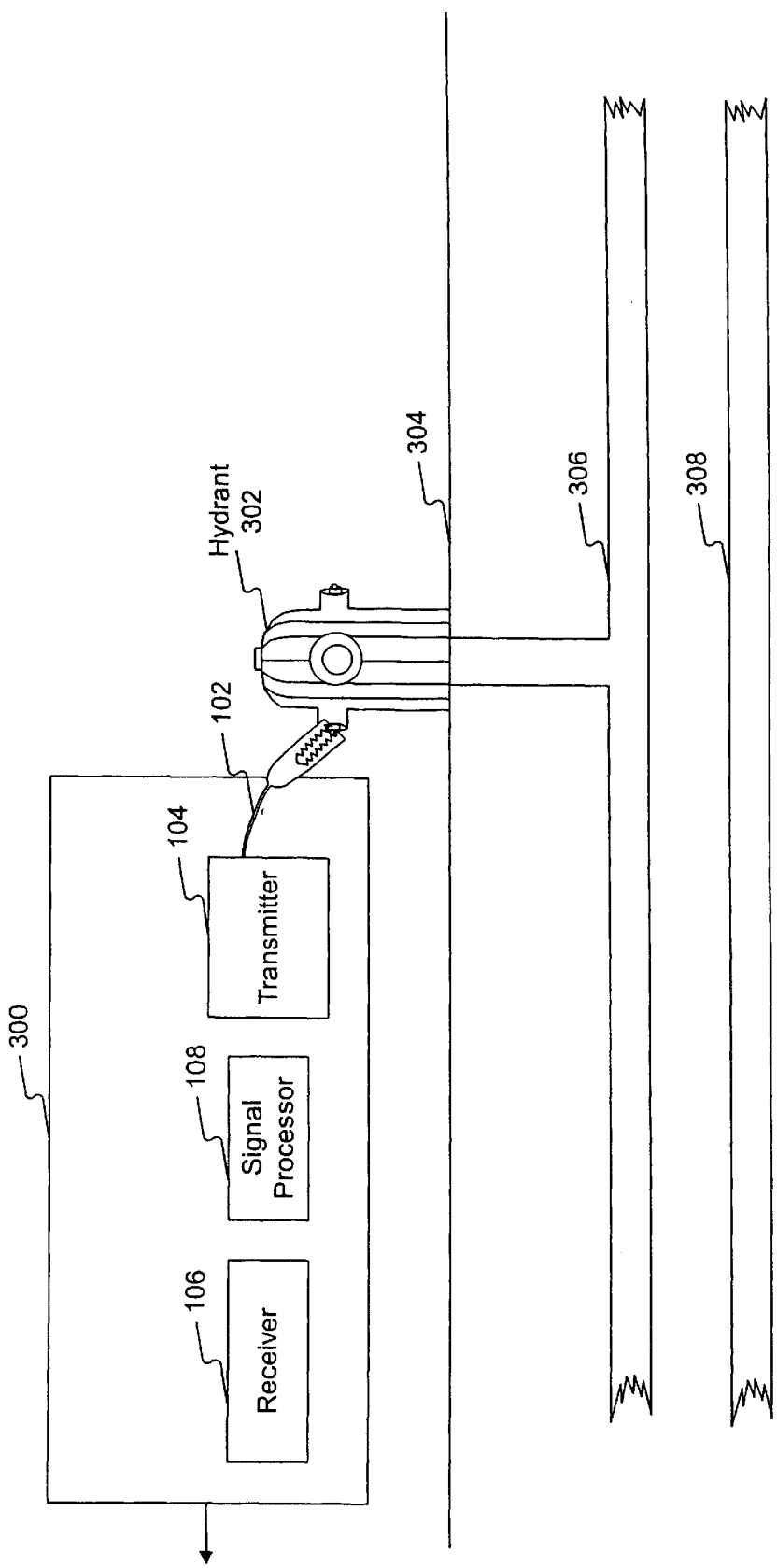
FIG. 3 is a schematic diagram of an embodiment of the present invention usable for locating objects.

FIG. 3 is a schematic diagram of an environment where an embodiment consistent with the present invention can be used to locate buried objects using parametric inversion. In FIG. 3 hydrant 302 protrudes from the ground 304. Target pipe 306 supplies water to hydrant 302. Running alongside target pipe 306 is secondary pipe 308. Apparatus 300 comprising receiver 106, signal processor 108, transmitter 104, and clamp 102 consistent with the present invention, locates target pipe 306 accurately without being confused by the presence of other nearby objects, such as secondary pipe 308.

To locate a buried object using an embodiment consistent with the present invention, an operator places clamp 102 on a portion of the object exposed above ground, e.g., hydrant 302. Transmitter 104, now coupled to hydrant 302 through clamp 102, injects a signal, for example, in the approximately 100 Hz to 100 kHz range into target pipe 306. Accordingly, a current that oscillates at the transmitter frequency is created in target pipe 306.

The current flowing in target pipe 306 causes current to flow on nearby pipes, such as secondary pipe 308. The current in the target and secondary pipes together create a magnetic field that can be measured on or above the surface of ground 304 using receiver 106. In an embodiment consistent with the present invention, the magnetic field corresponding to the current running through the target and secondary pipes is received at more than one elevation above the ground 304 by receiver 106. For example, receiver 106 can be positioned to receive the magnetic field at the ground surface and at one foot above the ground surface. Signal processor 108 processes the magnetic field signal received by receiver 106 to obtain two-dimensional maps of the magnetic field.

In another embodiment consistent with the present invention, transmitter 104 is modified to transmit at multiple frequencies simultaneously. Clamp 102 is modified to inductively or conductively couple to multiple pipes at each of the frequencies generated by the transmitter. Accordingly, currents at different frequencies can be injected into multiple pipes simultaneously, with one frequency injected per pipe. Under this approach, each of the pipes receiving a different transmitter frequency is considered a target pipe. Receiver 106 receives the magnetic field at the different transmitter frequencies. Signal processor 108 processes the magnetic field signal received by receiver 106 at the different frequencies and generates two-dimensional maps of the magnetic field to locate the buried object.

Figure 4:
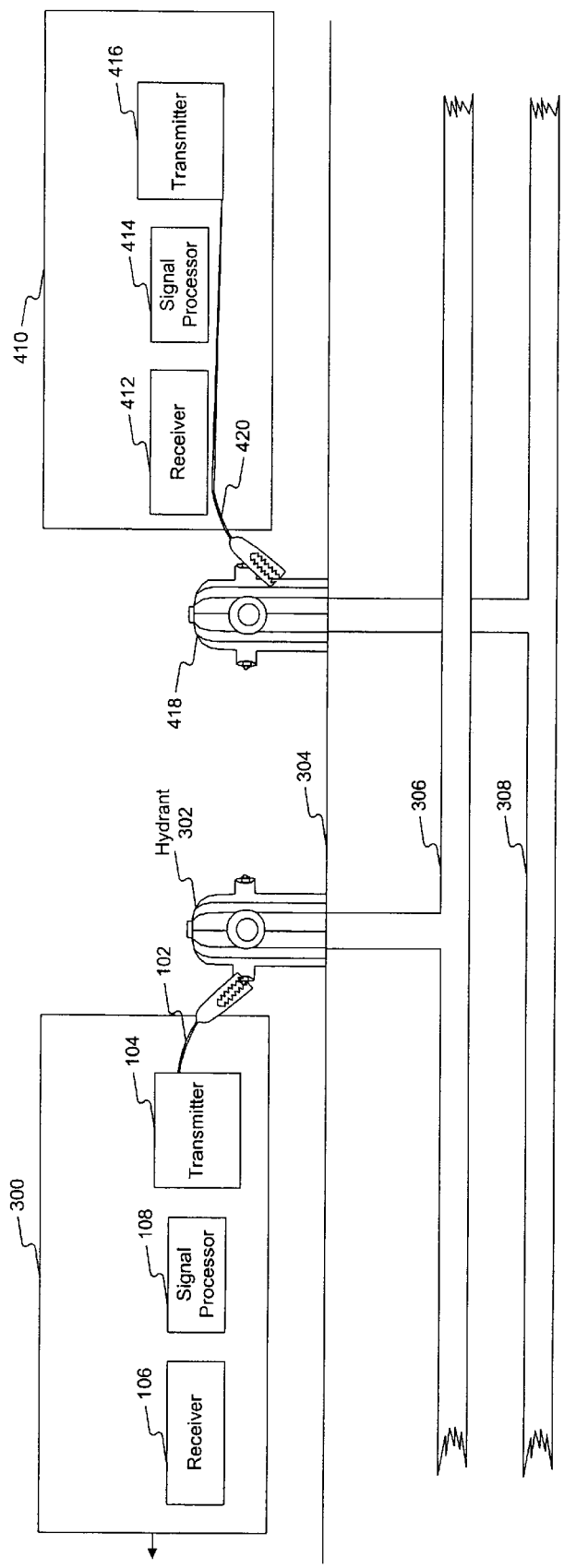
FIG. 4 is a schematic diagram of an embodiment of the present invention which can be used to locate objects.

An embodiment consistent with the present invention for locating object by injecting signals into two pipes is shown in FIG. 4. In addition to the elements in FIG. 3, FIG. 4 includes a second apparatus 410 including receiver 412, signal processor 414, and transmitter 416. Although 410 is depicted as a separate apparatus in FIG. 4, multiple receivers, signal processors, and transmitters can be combined (all or in part) in a single housing. Moreover, what are shown as separate receiver, signal processor, and transmitter elements can also be combined.

In FIG. 4, hydrant 302 connects to pipe 306 and hydrant 418 connects to pipe 308. Clamp 102 of apparatus 300 is connected to hydrant 302 and clamp 420 is connected to hydrant 418. After the connections are made to the hydrants, apparatus 300 injects a signal at a first frequency into pipe 306 through hydrant 302 and apparatus 410 injects a signal at a second frequency into pipe 308 through hydrant 418. The receivers and signal processors in apparatus 300 and apparatus 410 process the magnetic field corresponding to the signals injected at the two transmitter frequencies to locate the underground pipes.

An embodiment of signal processor 108 consistent with the present invention implements an algorithm for creating two-dimensional maps of the magnetic field for locating buried objects, e.g., pipes. When implementing the algorithm, the signal processor maps the environment depicted in FIG. 3 to a three-dimensional Cartesian coordinate system. The half space above ground 304 is z>0. Pipes are buried beneath the ground, i.e., in the region z<0. $B_x(\bar{r})$, $B_y(\bar{r})$, and $B_z(\bar{r})$ are the x, y, and z components, respectively, of the magnetic field detected by receiver 106 at a point $\bar{r}$. When the receiver is constructed as an array of receiver elements, $B_x(\bar{n})$, $B_y(\bar{n})$, and $B_z(\bar{n})$ are the output of the receiver array elements in the x, y, and z directions at each of the receiver elements, $i=1, 2, 3, \ldots, N_r$, where $N_r$ is the number of receiver locations. For example, when the magnetic field is measured at two heights on an $N_x \times N_y$ grid, the total number of receiver locations is $N_r = 2N_x N_y$.

When locating objects by injecting a signal into the buried pipes having a frequency in the range of 100 Hz to 100 KHz range, the spatial dependence of $B_x(\bar{r})$, $B_y(\bar{r})$, and $B_z(\bar{r})$ can be approximated by the spatial dependence of the magnetic field due to static line currents that flow along the pipes. The shape of the buried pipes can be modeled as piecewise straight lines. The injected signal creates a line current in the pipes. For example, the line current between two points on a buried pipe $\bar{r}_a$ and $\bar{r}_b$ is $\bar{I}_{ab}$. The magnetic field corresponding to the line current $\bar{I}_{ab}$ can be computed by signal processor 108 using a parametric model given by the following equation:

$$\bar{B}(\bar{r}, \bar{r}_a, \bar{r}_b, \bar{I}_{ab}) = \frac{\mu_0}{4\pi} \bar{I}_{ab} \otimes \int_{\bar{r}_a}^{\bar{r}_b} \frac{\bar{r} - \bar{r}'}{|\bar{r} - \bar{r}'|^3} ds' = \qquad (1)$$

$$\frac{\mu_0 \bar{I}_{ab} \otimes (\bar{r} - \bar{r}_a)}{4\pi \left(|\bar{r} - \bar{r}_a|^2 - \left[\hat{I}_{ab} \cdot (\bar{r} - \bar{r}_a)\right]^2\right)} \left[\frac{\hat{I}_{ab} \cdot (\bar{r}_b - \bar{r})}{|\bar{r}_b - \bar{r}|} - \frac{\hat{I}_{ab} \cdot (\bar{r}_a - \bar{r})}{|\bar{r}_a - \bar{r}|}\right]$$

The variable $\hat{I}_{ab} = (\bar{r}_b - \bar{r}_a)/|\bar{r}_b - \bar{r}_a|$ is a unit vector in the direction of current $\bar{I}_{ab} = I_{ab} \hat{I}_{ab}$, and $\mu_0 = 1.256 \cdot 10^{-6}$ H/m is the permeability of a vacuum. The symbol $\hat{\times}$ is the vector cross product operator. A general curved path model for a pipe could be used instead of the straight-line model in equation (1). The magnetic field of a curved path segment that begins at $\bar{r}_a$ and ends at $\bar{r}_b$ is given by the integral term in equation (1) with the term "$\bar{I}_{ab} \hat{\times}$" moved under the integral sign. Thus, the integral becomes $$\int_{\bar{r}_a}^{\bar{r}_b} \bar{I}_{ab} \otimes \frac{\bar{r} - \bar{r}'}{|\bar{r} - \bar{r}'|^3} ds'.$$

The value $$\frac{\mu_0}{4\pi}$$

is one example of a multiplier consistent with the present invention. One skilled in the art will recognize that other multipliers are also appropriate. For example, one skilled in the art will recognize that other values for permeability can be used to compute the measured magnetic field, some of these values will lead to a variation of the equation above.

Signal processor 108 constructs a model for the pipes buried beneath the ground using the magnetic field. For example, consider a model containing N pieces of line current having endpoints given by $\bar{r}_{ap}$ and $\bar{r}_{bp}$ with p=1, 2, 3, . . . , N. The corresponding current strengths are $\bar{I}_{abp}$. To match the model for the pipes to the received field, signal processor A08 computes a cost function from the x component of the magnetic field using the equation:

$$C_x(\bar{r}_{a1}, \bar{r}_{a2}, \ldots, \bar{r}_{aN}, \bar{r}_{b1}, \bar{r}_{b2}, \ldots, \bar{r}_{bN}, \bar{I}_{ab1}, \bar{I}_{ab2}, \ldots, \bar{I}_{abN}) = \quad (2)$$

$$\sum_{i=1}^{N_r} \sum_{p=1}^{N} ||B_x(\bar{r}_i, \bar{r}_{ap}, \bar{r}_{bp}, \bar{I}_{abp})| - B_x^O(\bar{r}_i)|^\alpha$$

The variable $\alpha$ is a positive constant. For example, when $\alpha$ is 2, this creates a least squared error objective function. The variable $B_x^O$ is the x component of the observed magnetic field. Similar cost functions can be computed for other components of the magnetic field.

Signal processor 108 computes parameters of the model by parametric inversion, for example, endpoints $\bar{r}_{ap}$, endpoints $\bar{r}_{bp}$, and currents $\bar{I}_{abp}$ in a manner that reduces the cost function in equation (2), and results in values for the modeled current that are close to the actual value of the current running through the pipes. In an embodiment consistent with the present invention, parametric inversion computations performed by signal processor 108 to compute equation (2) follow Newton optimization techniques such as those implemented the Optimization Toolbox in the MAT-LAB program available from Mathworks.

Figure 5:
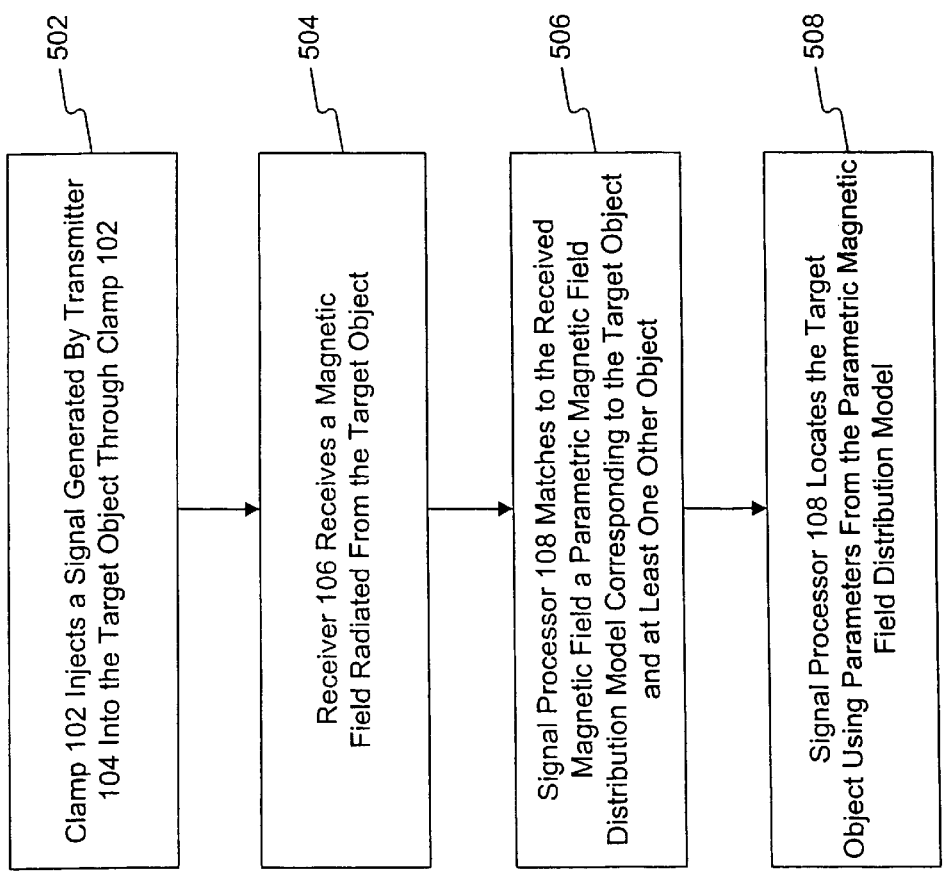
FIG. 5 is a flow diagram of a method for locating an object consistent with the present invention.

FIG. 5 is a flow diagram of a method for locating a target object consistent with the present invention comprising injecting a signal generated by transmitter 104 into the target object through clamp 102 (step 502). Receiver 106 receives a magnetic field radiated from the target object (step 504). Signal processor 108 matches to the received magnetic field a parametric magnetic field distribution model corresponding to the target object and at least one other object (e.g., as given in equation 1) (step 506). Signal processor 108 locates the target object using parameters from the parametric magnetic field distribution model (step 508).

The signal processor functions described above can be implemented using a single processor or a group of processors that execute a software program stored in memory, wherein the software relates to each of the above-described system operations. Moreover, in embodiments consistent with the scope of the present invention, the functions described herein can be implemented entirely in hardware, or in embodiments allocating the described functions among hardware and software elements. These and other embodiments that one skilled in the art will recognize are consistent with the scope of the present invention still fall within the scope of the invention.

The operation of the system elements as defined above provide an efficient system to rapidly and accurately locate buried objects. Therefore, in accordance with the present invention, the disclosed system elements can be housed in many types of structures, including portable and mobile structures to allow rapid and accurate real-time surveying of a region of interest.

Figure 6:
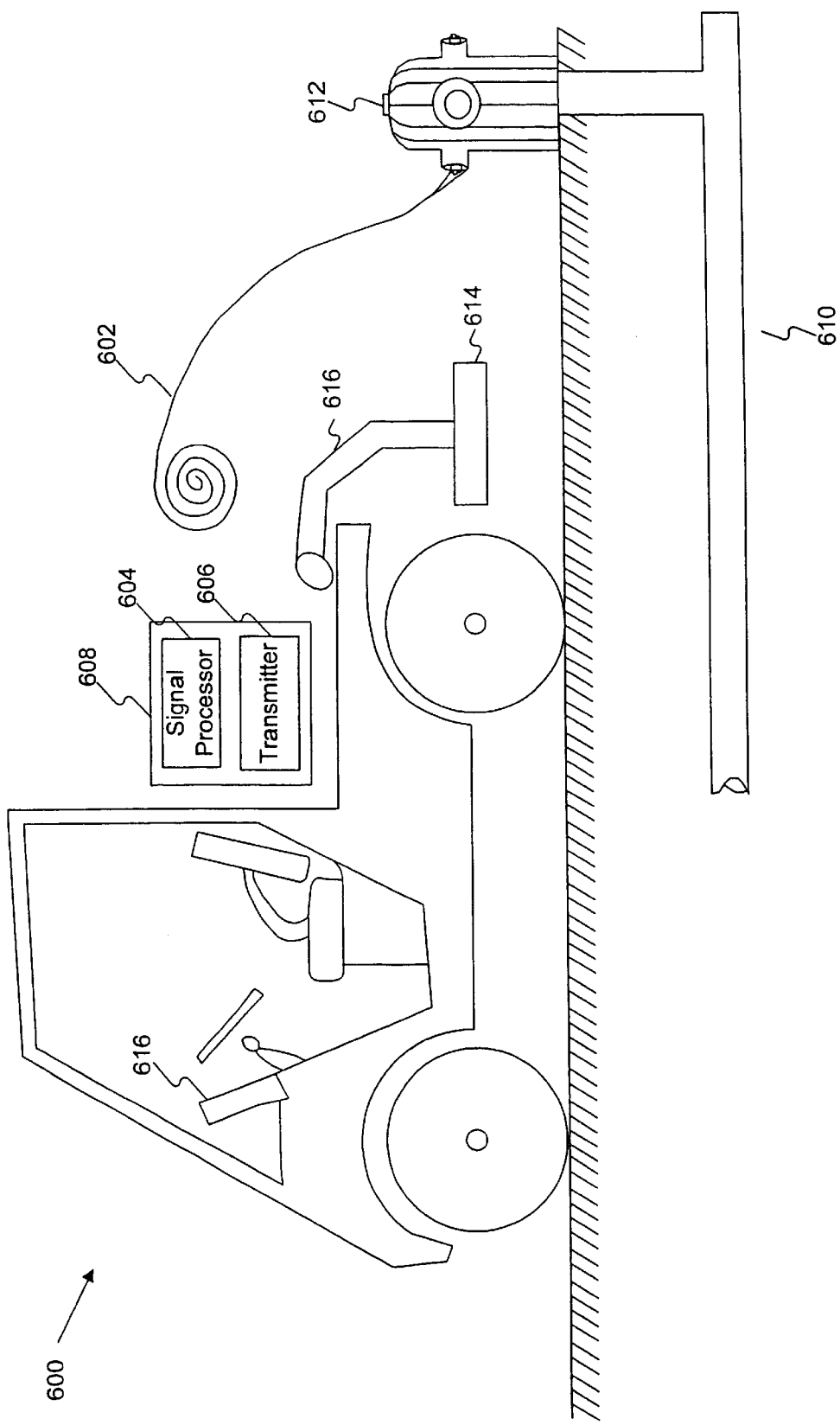
FIG. 6 is a schematic diagram of an embodiment of a mobile vehicle-based system for locating objects consistent with the present invention.

FIG. 6 is a diagram of a mobile vehicle 600 with a system for locating a target object consistent with the present invention. An extendable and retractable clamp 602 is mounted on mobile vehicle 600. Unit 608 houses signal processor 604 and transmitter 606. Clamp 602 injects a signal generated by transmitter 606 into a target pipe 610 by clamping to hydrant 612. Receiver 614 attaches to arm 616, which attaches to the back of vehicle 600. Signal processor 604 processes the signal received by receiver 614 as described in greater detail above and can display an image of the target on display 616.

Figure 7:
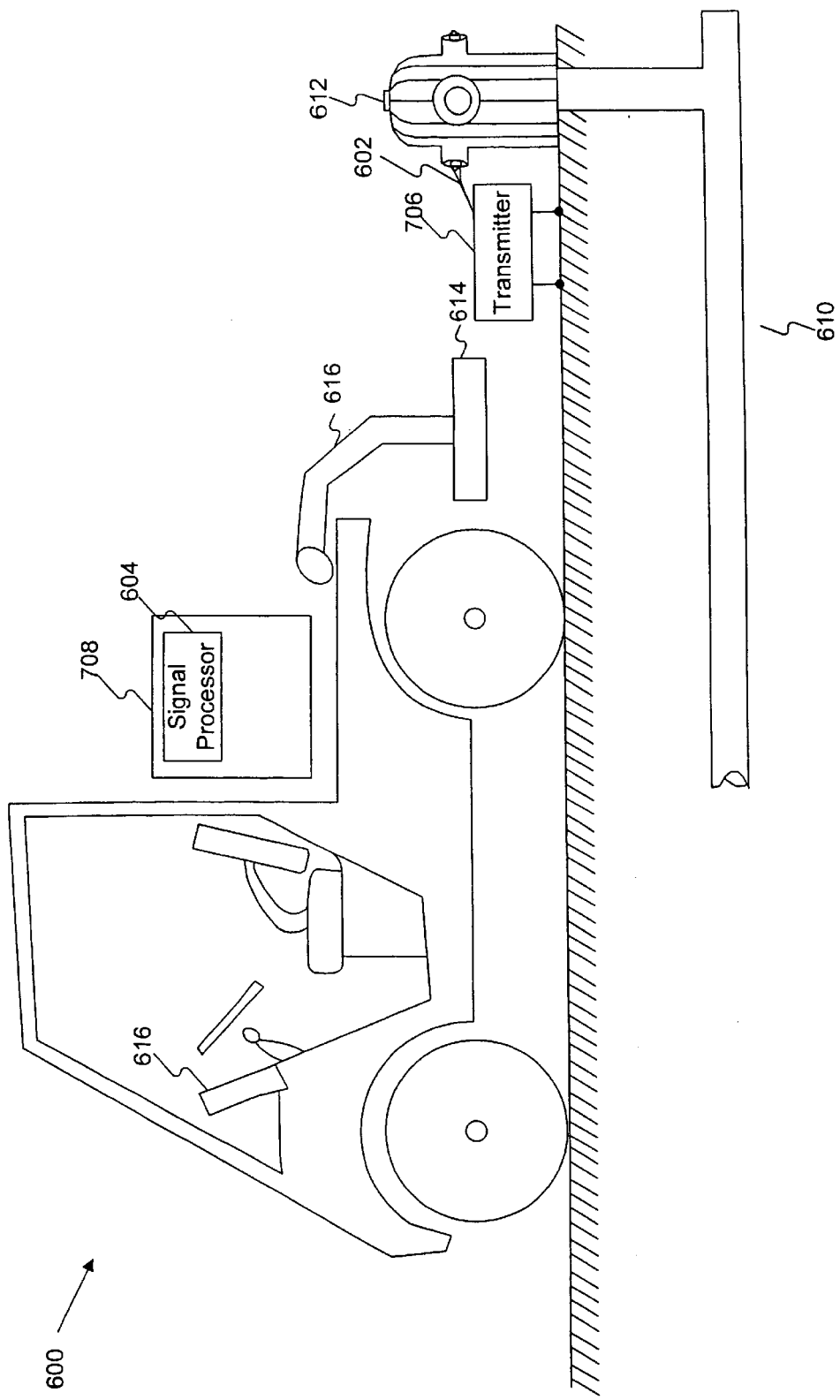
FIG. 7 is a schematic diagram of an embodiment of a mobile vehicle-based system for locating objects consistent with the present invention.

FIG. 7 is a diagram of mobile vehicle 600 where unit 708 houses signal processor 604, but does not contain a transmitter. Instead, transmitter 706 clamps to hydrant 612 and is not transported by the mobile vehicle.

Figure 8:
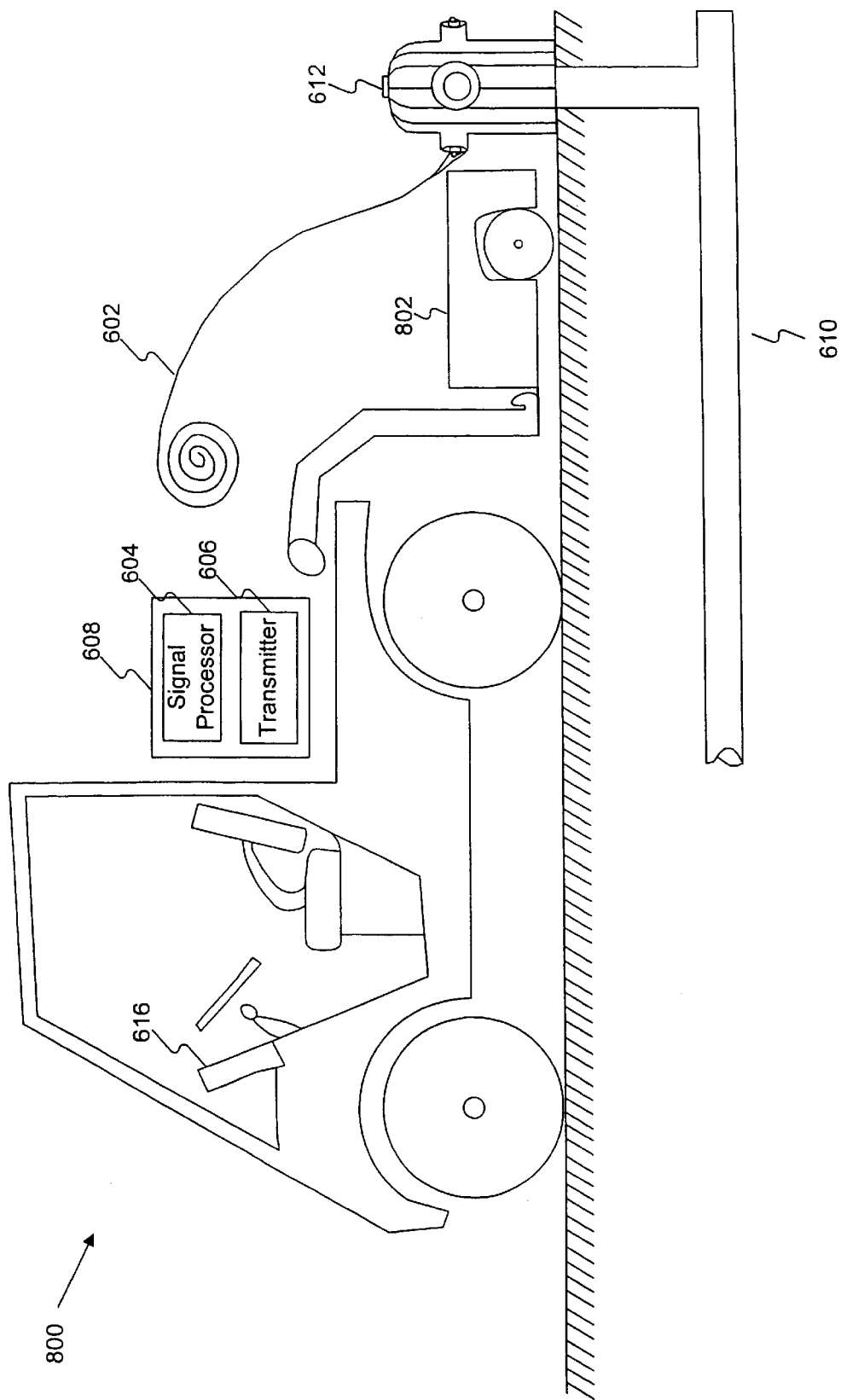
FIG. 8 is a schematic diagram of an embodiment of a mobile vehicle-based system for locating objects consistent with the present invention.

FIG. 8 is a diagram of a mobile vehicle 800 consistent with the present invention where one or more of receiver 614, signal processor 604, transmitter 606, and clamp 602 can be housed in trailer 802 and pulled behind the vehicle over the target 610.

Figure 9:
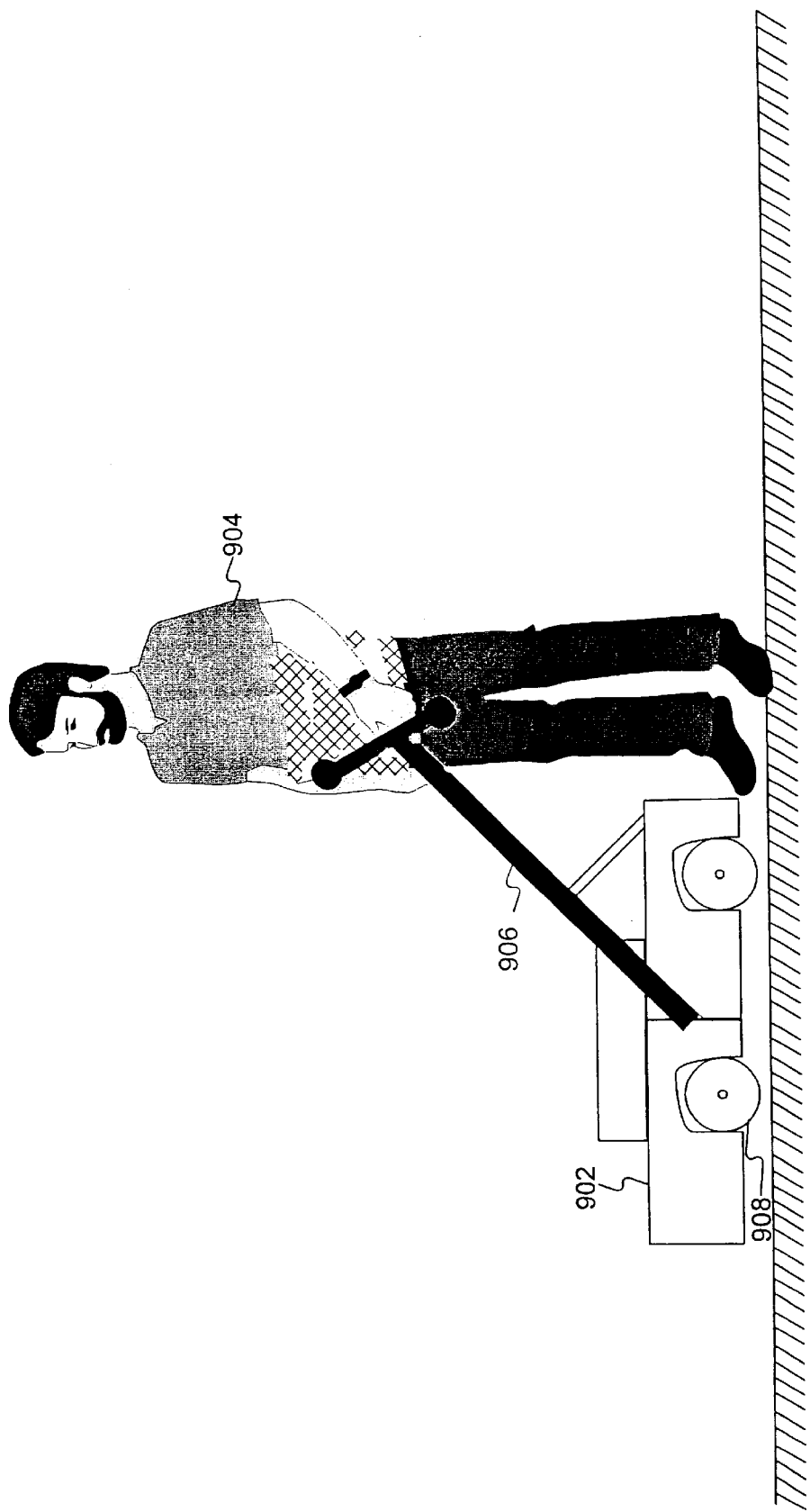
FIG. 9 is a schematic diagram of an embodiment of a portable locating device consistent with the present invention.

FIG. 9 is a diagram of a portable housing 902 containing a locating system consistent with the present invention. In the embodiment shown in FIG. 9, housing 902 contains a clamp, a transmitter, a receiver, and a signal processor as described in greater detail above. An operator 904 may guide portable housing 902 over the ground using handle 906. Portable housing 902 may have, for example, wheels 908 or a skid pad (not shown). An embodiment of portable housing 902 can also be made sufficiently light to allow an operator to carry the entire system, thereby alleviating the need for wheels, skid pads, or similar structure to guide the housing over the ground.

It will be apparent to those skilled in the art that various modifications and variations can be made to the disclosed embodiments of the present invention without departing from the spirit or scope of the invention. Thus it is intended that the present invention cover the modifications and variations of this invention provided they come within the scope of the appended claims and their equivalents.

We claim:

1. A method for locating a target object, at least a portion of which is buried, comprising:
    injecting a signal into the target object;
    receiving a magnetic field radiated from the target object;
    determining parameters in a parametric magnetic field distribution model corresponding to the target object and at least one other object so that the difference between the model and the received magnetic field minimizes a preselected cost function; and
    locating the target object using parameters from said parametric magnetic field distribution model.

2. The method of claim 1, wherein the determining step comprises the substep of:
    selecting a parametric magnetic field distribution model corresponding to at least two substantially linear objects.

3. The method of claim 1, wherein the determining step comprises the substep of:
    selecting a parametric magnetic field distribution model that models a substantially curved region in said target object as at least two linear objects.

4. The method of claim 1, further comprising the step of:
    injecting at least one additional signal into an object other than the target object to create the magnetic field,
    and wherein the determining step further comprises the substep of using the injected at least one additional signal to generate a match.

5. The method of claim 1, where the determining step includes the substep of using a parametric magnetic field distribution model at a receiver location $\bar{r}$, the model including at least a term corresponding to $\overline{B}(\bar{r}, \bar{r}_z, \bar{r}_b, \bar{I}_{ab})$ having the form:

$$k\bar{I}_{ab} \otimes \int_{\bar{r}_a}^{\bar{r}_b} \frac{\bar{r} - \bar{r}'}{|\bar{r} - \bar{r}'|^3} d\bar{r}'$$

where:
    $\overline{B}$ is the modeled magnetic field;
    $\bar{I}_{ab}$ is points and b the target object;

k is a multiplier;
$\bar{r}_a$ is a first point on the target object; and
$\bar{r}_b$ is a second point on the target object.

6. The method of claim 1, further comprising:
displaying the target object location.

7. The method of claim 1, wherein the step of receiving a magnetic field radiated from the target comprises the substep of:
receiving the magnetic field at at least two elevations above the target object.

8. An apparatus for locating a target object, at least a portion of which is buried, comprising:
a signal injector capable of injecting a signal into the target object;
a magnetic field receiver;
a processor for determining parameters in a parametric magnetic field distribution model corresponding to the target object and at least one other object so that the difference between the model and a magnetic field received by said magnetic field receiver minimizes a preselected cost function; and
a locating processor for locating the target object using parameters from said parametric magnetic field distribution model.

9. The apparatus of claim 8, wherein the processor comprises:
a parametric magnetic field distribution model corresponding to at least two substantially linear objects.

10. The apparatus of claim 8, wherein the processor comprises:
a parametric magnetic field distribution model that models a substantially curved region in said target object as at least two linear objects.

11. The apparatus of claim 8, further comprising:
an injector for injecting at least one additional signal into an object other than the target object to create the magnetic field;
and wherein the processor further comprises a processor for using the injected at least one additional signal to generate a match.

12. The apparatus of claim 8, wherein the processor further comprises a parametric magnetic field distribution model at a receiver location $\bar{r}$, the model including at least a term corresponding to $\bar{B}(\bar{r}, \bar{r}_a, \bar{r}_b, \bar{I}_{ab})$ having the form:

$$k \bar{I}_{ab} \otimes \int_{\bar{r}_a}^{\bar{r}_b} \frac{\bar{r} - \bar{r}'}{|\bar{r} - \bar{r}'|^3} d\bar{r}'$$

where:
$\bar{B}$ is the modeled magnetic field;
$\bar{I}_{ab}$ is a line current between points a and b on the target object;
k is a multiplier;
$\bar{r}_a$ is a first point on the target object; and
$\bar{r}_b$ is a second point on the target object.

13. The apparatus of claim 8 further comprising:
a target object display.

14. The apparatus of claim 8, wherein at least one of said signal injector, magnetic field receiver, matching processor, and locating processor is mounted in a mobile platform.

15. The apparatus of claim 8, wherein at least one of said signal injector, magnetic field receiver, matching processor, and locating processor is mounted in a portable platform.

16. A computer program product for use in a computer adapted for locating a target object, at least a portion of which is buried, the computer program product comprising a computer readable medium for storing computer readable code means, which when executed by the computer, enables the computer to locate the target object, and wherein the computer readable code means includes computer readable instructions for causing the computer to execute a method comprising:
injecting a signal into the target object;
receiving a magnetic field radiated from the target object;
determining parameters in a parametric magnetic field distribution model corresponding to the target object and at least one other object so that the difference between the model and the received magnetic field minimizes a preselected cost function; and
locating the target object using parameters from said parametric magnetic field distribution model.

17. The computer program product of claim 16, wherein the computer readable code means further includes computer readable instructions for causing the computer to compute parameters of a parametric magnetic field distribution model at a receiver location $\bar{r}$, the model including at least a term corresponding to $\bar{B}(\bar{r}, \bar{r}_a, \bar{r}_b, \bar{I}_{ab})$ having the form:

$$k \bar{I}_{ab} \otimes \int_{\bar{r}_a}^{\bar{r}_b} \frac{\bar{r} - \bar{r}'}{|\bar{r} - \bar{r}'|^3} d\bar{r}'$$

where:
$\bar{B}$ is the modeled magnetic field;
$\bar{I}_{ab}$ is a line current between points a and b on the target object;
k is a multiplier;
$\bar{r}_a$ is a first point on the target object; and
$\bar{r}_b$ is a second point on the target object.

18. An apparatus for locating a target object, at least a portion of which is buried, comprising:
means for injecting a signal into the target object;
means for receiving a magnetic field radiated from the target object;
means for determining parameters in a parametric magnetic field distribution model corresponding to the target object and at least one other object so that the difference between the model and the received magnetic field minimizes a preselected cost function; and
means for locating the target object using parameters from said parametric magnetic field distribution model.

19. The apparatus of claim 18, wherein the means for determining further comprises:
means for selecting a parametric magnetic field distribution model corresponding to at least two substantially linear objects.

20. The apparatus of claim 18, wherein the means for determining further comprises:
means for selecting a parametric magnetic field distribution model that models a substantially curved region in said target object as at least two linear objects.

21. The apparatus of claim 18, further comprising:
means for injecting at least one additional signal into an object other than the target object to create the magnetic field;
and wherein the means for determining further comprises means for using the injected at least one additional signal to generate a match.

22. The apparatus of claim 18, where the means for matching determining further comprises means for using a parametric magnetic field distribution model at a receiver location 7, the model including at least a term corresponding to $\overline{B}(\overline{r},\overline{r}_a, \overline{r}_b, \overline{I}_{ab})$ having the form:

$$k\overline{I}_{ab} \otimes \int_{\overline{r}_a}^{\overline{r}_b} \frac{\overline{r} - \overline{r}'}{|\overline{r} - \overline{r}'|^3} d\overline{r}'$$

where:
$\overline{B}$ is the modeled magnetic field;
$\overline{I}_{ab}$ is a line current between points a and b on the target object;
k is a multiplier;
$\overline{r}_a$ is a first point on the target object; and
$\overline{r}_b$ is a second point on the target object.

23. The apparatus of claim 18, wherein at least one of said means for injecting, means for receiving, means for determining, and means for locating is mounted in a mobile platform.

24. The apparatus of claim 18, wherein at least one of said means for injecting, means for receiving, means for determining, and means for locating is mounted in a portable platform.

25. A method for locating a target object, at least a portion of which is buried, comprising:
injecting a first signal into the target object;
injecting a second signal into a secondary object, at least a portion of which is buried;
receiving a magnetic field at a first frequency attributable to the target object;
receiving a second magnetic field at a secondary frequency attributable to the secondary object;
determining parameters in a parametric magnetic field distribution model corresponding to at least two objects so that the difference between the model and the first and second magnetic fields minimizes a preselected cost function; and
locating the target object and the secondary object using parameters from said parametric magnetic field distribution model.

26. The method of claim 25, where the determining step includes the substep of using a parametric magnetic field distribution model at a receiver location $\overline{r}$, the model including at least a term corresponding to $\overline{B}(\overline{r}, \overline{r}_a, \overline{r}_b, \overline{I}_{ab})$ having the form:

$$k\overline{I}_{ab} \otimes \int_{\overline{r}_a}^{\overline{r}_b} \frac{\overline{r} - \overline{r}'}{|\overline{r} - \overline{r}'|^3} d\overline{r}'$$

where:
$\overline{B}$ is the modeled magnetic field; $\overline{I}_{ab}$ a line current between points and b the target object;
k is a multiplier;
$\overline{r}_a$ is a first point on the target object; and
$\overline{r}_b$ is a second point on the target object.

* * * * *